April 23, 1935.  W. P. WORRELL ET AL  1,998,827
COMPOSITE ARTICLES AND THEIR METHOD OF MANUFACTURE
Filed March 10, 1932
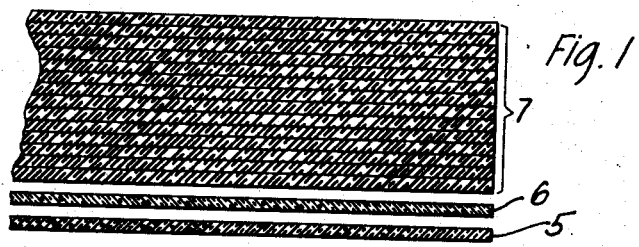
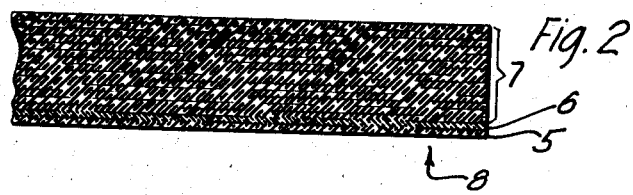
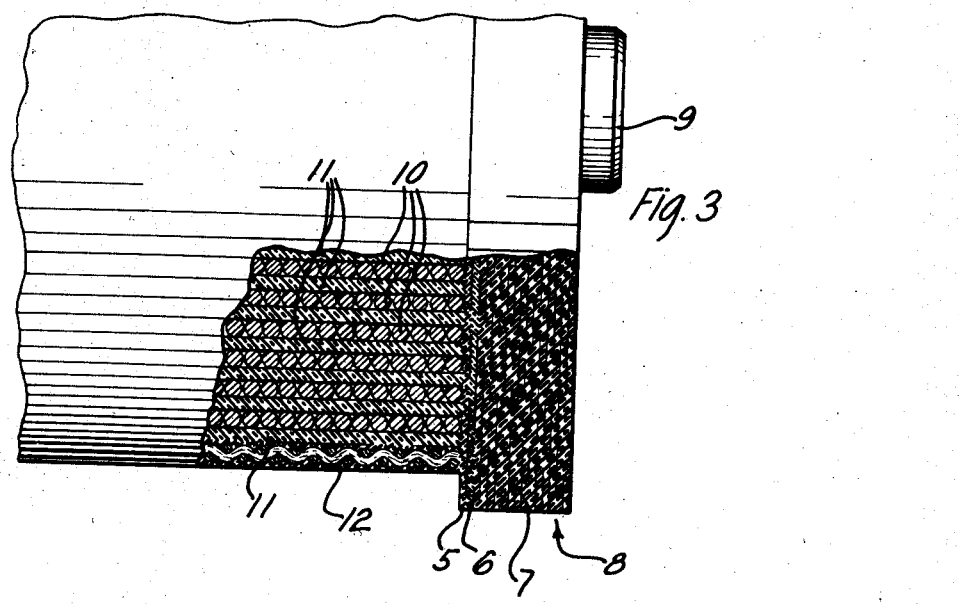
Inventors
W. P. Worrell
F. E. Gruber
By H.A. Whitehorn Atty.

Patented Apr. 23, 1935

1,998,827

UNITED STATES PATENT OFFICE 1,998,827

COMPOSITE ARTICLES AND THEIR METHOD OF MANUFACTURE

Willard P. Worrell, Riverside, and Francis E. Gruber, Berwyn, Ill., assignors to Western Electric Company, Incorporated, New York, N. Y., a corporation of New York Application March 10, 1932, Serial No. 597,962

10 Claims. (Cl. 175—21)

This invention relates to composite articles and their method of manufacture, and more particularly to composite sheets of insulating material and the method of producing them.

It has been found difficult, if not impossible, to cause a fibrous sheet of phenol resin impregnated material to adhere to a fibrous sheet impregnated with cellulose acetate.

It is an object of the present invention to provide a cheap composite sheet of insulating material, and a simple and economical method of producing such a sheet.

The difficulty experienced in attempting to cause fibrous sheets of phenol resin impregnated material to adhere to fibrous sheets impregnated with cellulose acetate has been overcome in the present invention by utilizing an intermediate sheet impregnated with a mixture of phenol resin and cellulose acetate to which both the phenol resin impregnated sheet and the cellulose acetate impregnated sheet adhere.

In accordance with one embodiment, the invention contemplates a sheet of insulating material, particularly adapted for use as heads for electrical coils to which heads the coil may be attached by coalescing the insulating material of the head to insulating material wound in the coil. A preferred method of producing such a sheet is, to assemble layers of fibrous material impregnated with a phenol resin varnish, to place on one surface of the assembled sheets a sheet of fibrous material impregnated with a mixture of phenol resin varnish and a cellulose acetate solution, and upon this sheet to place a sheet of cellulose material and to subject the assembled sheets to heat and pressure to mold them and to cure the phenol resin and secure the sheet of cellulose material thereto.

Other features and advantages of the invention will become apparent from the following description, reference being had to the accompanying drawing, wherein Fig. 1 is a fragmentary disassembled sectional view through the sheets;

Fig. 2 is a fragmentary sectional view of the sheets shown in Fig. 1 after they have been heated and pressed to form the composite sheet, and Fig. 3 is a fragmentary elevational view partly in section of an electrical coil with a head formed of the composite material secured in place thereon.

Referring now to the drawing wherein like reference characters indicate the same parts throughout the several views, the numeral 5 indicates a sheet of cellulose acetate or a fibrous material impregnated with cellulose acetate which, in accordance with the preferred form of the invention, comprises one of the outer surfaces of the composite sheet. Upon the sheet 5 of cellulose material, a binder sheet 6 of paper or like fibrous material containing a mixture of phenol resin and cellulose acetate may be placed, and upon the sheet 6 there may be placed a plurality of sheets 7 of fibrous material such as paper impregnated with phenol resin in any well known manner suitable for forming a sheet of "phenol fiber". After the sheets 5, 6 and 7 are assembled as indicated by their relative positions in Fig. 1, the assembly may be subjected to heat and pressure to cure and mold the various sheets into a composite sheet 8 as indicated in Fig. 2.

The sheets of fibrous material impregnated with phenol resin may, as pointed out hereinbefore, be produced in any well known manner for forming phenol fiber, and the sheet of cellulose material may be composed of cellulose acetate and may be, for example, .001" in thickness, or may be a sheet of fibrous material impregnated with cellulose acetate and of any desired thickness.

The binder sheet 6 comprises a sheet of paper which has been impregnated in a solution of cellulose acetate and phenol resin so that the impregnated sheet will contain approximately 50 percent of cellulose acetate and phenol resin, and 50 percent paper. A solution suitable for impregnating the binder sheet may be comprised of eight ounces of plasticized cellulose acetate in solution in one gallon of acetone to which may be added sixteen ounces of phenol varnish. After the solution is made in the manner just described, it may be diluted with acetone sufficiently so that upon impregnating paper with the diluted solution an impregnated paper containing approximately 50 percent of the mixture of cellulose acetate and phenol resin, and 50 percent paper will be produced. The plasticizer used may be of any suitable type such that it will render the cellulose acetate sufficiently plastic at the temperature used in molding it so that the cellulose acetate in the binder sheet 6 will adhere to the cellulose acetate in the sheet 5.

After these sheets are assembled in the relative positions shown in Fig. 1, the whole pile-up of sheets 5, 6 and 7 is then pressed between metal plates at such a temperature and pressure, and for such a time as to cure the phenol fibre and cause the cellulose acetate sheet to adhere firmly to the assembly. A typical example of the heat and pressure required is a pressure of 1200 pounds per square inch, at a temperature of 360° F. for forty minutes.

An alternative method of preparing the binder sheet 6 for assembling with the sheets 7 of phenol impregnated fibrous material, and the sheet 5 of cellulose material, is to make a solution of cellulose acetate and a plasticizer in acetone mixed with an alcohol solution containing approximately 50 percent of phenol resin. The quantities of cellulose acetate and phenol resin in the resultant product therefore will be approximately equal. The absorbent paper is then impregnated with the above solution so that it contains approximately 45 percent of resin and cellulose acetate, and 55 percent paper and solvent and is then dried in an oven at a temperature sufficient to remove most of the solvents, but not high enough to cure completely the phenol resin, whereupon the binder sheet 6 may be assembled with the phenol resin impregnated sheets 7 and the cellulose acetate sheet 5 and subjected to heat and pressure to form the desired composite sheet 8.

Wherever the term "paper" has been used hereinbefore, it will be understood that fabric could be used in place of the paper if it were desired to have a fabric impregnated sheet. However, in the embodiment of the invention selected for illustration, the composite material being formed is adapted for use as the heads of electrical coils and fibrous material such as paper has proven more desirable for this use and accordingly a composite sheet in which impregnated paper is used throughout has been described.

The material described hereinbefore is particularly useful when it is to serve as the head of an electrical coil such as that shown in Fig. 3 which comprises a core 9 upon which are wound alternate layers of wire 10 and insulating material 11. It is preferred that the insulating material 11 be paper impregnated with cellulose acetate, and that the edges of the insulating material extend slightly beyond the servings of wire 10, and it is also preferred that the outer serving of insulating material 11 have superposed thereon a layer 12 of fabric impregnated and coated with cellulose acetate and having its ends extending slightly beyond the servings of wire 10. When a coil is formed in accordance with the method just described, the composite head 8 may be secured thereto by simply dipping the end of the formed coil in acetone or any other solvent for cellulose acetate to dissolve partially the cellulose acetate in the insulating material 11 and in the fabric outer casing 12, whereupon the head may be pressed into engagement with the edges of the insulating paper and the fabric to which it will be firmly attached by coalescence of the cellulose acetate in the sheet 5 and in the fabric 12 and insulating material 11. A coil formed in accordance with the just described method will have each layer of wire 10 sealed in an air tight envelope comprising the adjacent layers of insulating material 11 and the heads 8.

It has been determined that a coil head formed in accordance with the method described hereinbefore may be fixed to a coil in the manner described without the necessity of providing any other means for holding it in place.

Although specific examples of the quantities of the various ingredients used in making the composite sheet have been given hereinbefore, it is to be understood that the invention is to be limited only by the scope of the appended claims, wherein the term "cellulose material" is not to be limited to cellulose acetate, but is to include any cellulose esters and sheets of fibrous material impregnated with cellulose acetate or other cellulose esters.

What is claimed is:

1. A composite article comprising a fibrous sheet impregnated mainly with a phenol resin and a fibrous sheet impregnated with a mixture of a cellulose derivative and a phenol resin consolidated under heat and pressure.

2. A method of producing a composite article comprising assembling a sheet impregnated mainly with phenol resin, a sheet impregnated with a mixture of phenol resin and cellulose acetate, and a sheet of cellulose acetate; and subjecting the assembly to heat and pressure to cause the sheets to adhere to each other.

3. A method of forming a composite article comprising impregnating sheets of fibrous material mainly with phenol resin, impregnating a sheet of fibrous material with a solvent mixture of phenol resin and a cellulose derivative, drying the sheets to substantially expel the solvents, assembling the sheets of fibrous material impregnated with phenol resin and the sheet impregnated with the mixture of phenol resin and cellulose material on an outer surface thereof, applying to the sheet of phenol and cellulose impregnated material a sheet of cellulose material, and subjecting the assembly to heat and pressure to cure the phenol resin and cause the sheet of cellulose material to adhere to the assembly.

4. A composite article comprising a layer of fibrous material impregnated mainly with a phenol resin, a layer of fibrous material impregnated with a mixture of phenol resin and a cellulose derivative, and a layer of cellulose material molded together under heat and pressure.

5. A composite article comprising a fibrous sheet impregnated mainly with a phenol resin, and a fibrous sheet impregnated with a mixture of a phenol resin and a cellulose derivative, the quantity of mixture being equal in weight to the weight of the sheet impregnated, the sheets being molded together under heat and pressure.

6. A composite article comprising a fibrous sheet impregnated mainly with a phenol resin, and a fibrous sheet impregnated with a mixture comprising two parts of a cellulose derivative and one part of a phenol resin the sheets being molded together under heat and pressure.

7. A method of forming a composite article comprising preparing a mixture of phenol resin and a cellulose derivative, impregnating a sheet of fibrous material with said mixture, impregnating a sheet of fibrous material mainly with phenol resin, impregnating a sheet of fibrous material with a cellulose derivative, assembling said sheets with the sheet impregnated with said mixture between the other sheets, and subjecting the assembly to heat and pressure to form a composite article.

8. A composite article comprising an interleaving sheet of a cellulose derivative for a coiled conductor, and a head coalesced to an edge of said sheet, said head comprising a sheet of a cellulose derivative abutting said edge, a sheet of fabric impregnated with a mixture of a cellulose derivative and a phenol resin, and a sheet of fabric impregnated with a phenol resin.

9. A composite article comprising an interleaving sheet of a cellulose ester for a coiled conductor, and a head coalesced to an edge of said sheet, said head comprising a fabric sheet impregnated with a cellulose ester abutting said edge, a second fabric sheet secured thereto impregnated with a mixture of a cellulose ester and a phenol resin, and a third fabric sheet secured to the second fabric sheet and impregnated with a phenol resin.

10. A composite article comprising a casing for a coil and having a tubular member of a fibrous material impregnated with a cellulose ester, end members for hermetically sealing the ends of said tubular member comprising a sheet of a cellulose ester coalesced to the tubular member, a sheet of fibrous material impregnated with a mixture of a cellulose ester and a phenol resin secured to said first sheet, and a sheet of fibrous material impregnated with a phenol resin secured to said second sheet.

WILLARD P. WORRELL.
FRANCIS E. GRUBER.